US009676315B1

(12) United States Patent
Davis

(10) Patent No.: US 9,676,315 B1
(45) Date of Patent: Jun. 13, 2017

(54) LOADING RAMPS AND RAMP SUPPORT SYSTEM

(71) Applicant: William Jason Davis, Charleston, WV (US)

(72) Inventor: William Jason Davis, Charleston, WV (US)

(*) Notice: Subject to any disclaimer, the term of this patent is extended or adjusted under 35 U.S.C. 154(b) by 0 days.

(21) Appl. No.: 14/957,175

(22) Filed: Dec. 2, 2015

Related U.S. Application Data

(60) Provisional application No. 62/086,406, filed on Dec. 2, 2014.

(51) Int. Cl.
*B60P 1/43* (2006.01)
*B65G 69/30* (2006.01)

(52) U.S. Cl.
CPC ............... *B60P 1/43* (2013.01); *B65G 69/30* (2013.01)

(58) Field of Classification Search
CPC .......... B60P 1/43; B65G 69/30; E04F 11/002; E04F 11/18; E01D 15/12
See application file for complete search history.

(56) References Cited

U.S. PATENT DOCUMENTS

| | | | | |
|---|---|---|---|---|
| 5,568,694 A * | 10/1996 | Capra | ................... | E01H 5/06 37/231 |
| 5,649,732 A * | 7/1997 | Jordan | ................... | B60P 1/43 296/26.1 |
| 6,076,215 A * | 6/2000 | Blankenship | ............. | B60P 1/43 14/69.5 |
| 6,250,874 B1 * | 6/2001 | Cross | ................... | B60P 1/43 296/61 |
| 6,536,822 B1 * | 3/2003 | Vagedes | ................... | B60P 1/435 296/26.08 |
| 8,061,754 B1 * | 11/2011 | Webb | ................... | B60P 1/43 14/71.1 |
| 8,302,235 B1 * | 11/2012 | Bailie | ................... | B60P 1/43 14/69.5 |
| 8,561,238 B1 * | 10/2013 | Inget | ................... | B60P 1/435 14/71.1 |
| 2012/0204360 A1 * | 8/2012 | Chamoun | ............ | B62D 63/061 14/2.4 |
| 2014/0338137 A1 * | 11/2014 | Stokes | ................... | B60D 1/06 14/71.1 |

* cited by examiner

*Primary Examiner* — Abigail A Risic
(74) *Attorney, Agent, or Firm* — Dinsmore & Shohl LLP; Monika L. Jaensson, Esq.

(57) ABSTRACT

A support system for loading ramps useful in loading and unloading vehicles and other machinery in truck beds and similar storage and transport structures. The support system includes a horizontal support which couples with a hitch receiver, a vertical support having a central aperture at its top to receive a support bar of a loading ramp system, and an angle brace designed and configured to be removably affixed to the horizontal and vertical supports. The angle brace may extend at an angle of between 20 and 40 degrees or between 50 and 70 degrees from horizontal. In some embodiments the support system is provided with a ramp system including a pair of ladder ramps, each ladder ramp having two ladder ramp segments hingedly connected. In these and other embodiments the support system may be provided with a ramp system including an arced segment near the top portion thereof.

4 Claims, 7 Drawing Sheets

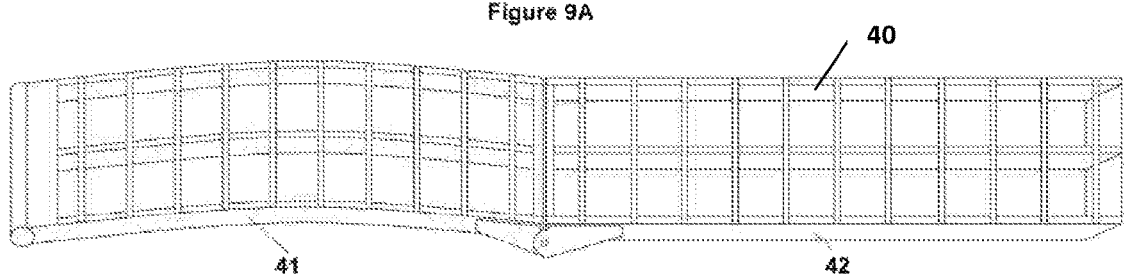
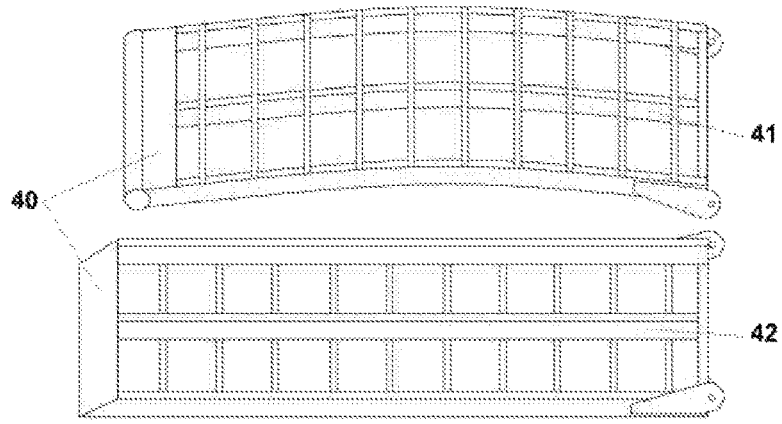

US 9,676,315 B1

LOADING RAMPS AND RAMP SUPPORT SYSTEM

BACKGROUND OF THE TECHNOLOGY

The disclosed technology provides a novel means for supporting loading ramps useful in loading vehicles and other machinery into and out of truck beds, vehicle flatbeds or other storage or transport means. The disclosed technology further regards novel ramp systems useful with the ramp support to facilitate loading vehicles and other machinery into and out of such storage and transport means.

Current ramp systems useful for loading vehicles or other machinery into and out of truck beds, vehicle flatbeds and other storage or transport means include cumbersome and inflexible designs. The disclosed technology provides an adjustable and durable ramp support system for use with a variety of vehicles and machinery, and in some embodiments provides an arced ramp system for loading certain machinery having limited substructure clearance, and hinged ramp structures for compact storage.

GENERAL DESCRIPTION OF THE TECHNOLOGY

The disclosed technology provides a support system for loading ramps useful in loading and unloading vehicles and other machinery in truck beds and similar storage and transport structures. Generally the support system includes a horizontal support designed and configured to couple with a vehicle hitch receiver, a vertical support having a central aperture at the top thereof to receive a support bar of a loading ramp system, and an angle brace designed and configured to be removably affixed to the horizontal support and the vertical support.

The angle brace may be designed as a tubular bar extending at an angle of between 20 and 40 degrees from horizontal, or between 50 and 70 degrees from horizontal, depending upon assembly configuration. In some embodiments the tubular bar extends at an angle of 30 degrees from horizontal, and 60 degrees from vertical or, when in its reversed position, 60 degrees from horizontal and 30 degrees from vertical. Each end of the angle brace is provided with mounting brackets positioned in the horizontal and vertical planes, respectively. The mounting brackets include a plurality of apertures to receive bolts facilitating the removable affixation of the angle brace to the horizontal and vertical supports; further corresponding plates may be provided for positioning on the opposing side of each support, having apertures to receive the bolts.

In some embodiments the support system is provided with a ramp system including a pair of ladder ramps, each ladder ramp having two ladder ramp segments hingedly connected. In these and other embodiments the support system may be provided with a ramp system including an arced segment near the top portion thereof.

DESCRIPTION OF THE FIGURES

FIGS. 9A and 9B are top views of the hinged ladder component of some embodiments of the disclosed technology, shown in both extended and folded positions, respectively.

DETAILED DESCRIPTION OF THE TECHNOLOGY

As shown in FIGS. 1-3, 6 and 7, the ramp support of disclosed technology includes a horizontal support 10, a vertical support 20 and an angle brace 30.

In some embodiments the horizontal support 10 is designed and configured to be removably received within a hitch receiver H mounted on the hitch of a vehicle. An end of the horizontal support is secured in the hitch receiver by means of a removable bolt, a hitch pin or other similar device received in corresponding apertures on the sides of the horizontal support and the hitch receiver. The horizontal support 10 may be constructed from low-carbon steel 2"×2" square tubing.

Figure 5:
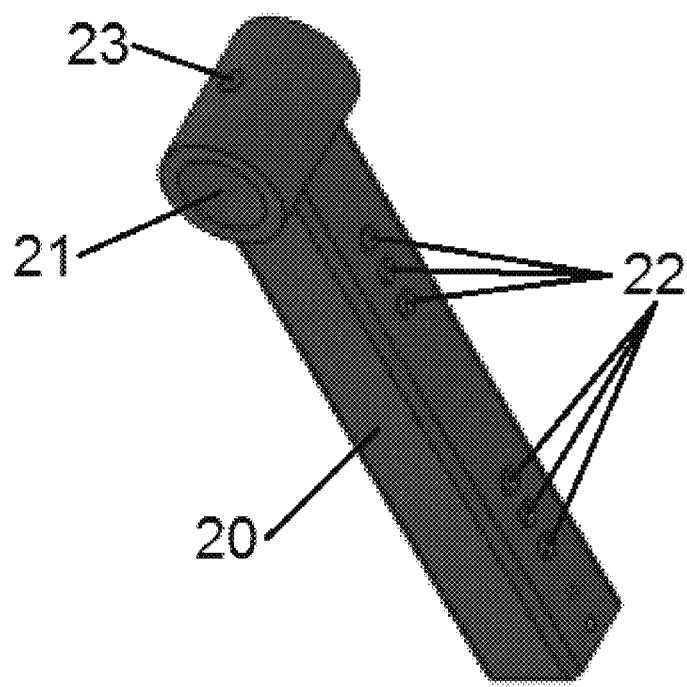
FIG. 5 is a perspective view of a vertical support useful in the disclosed technology.
Figure 6:
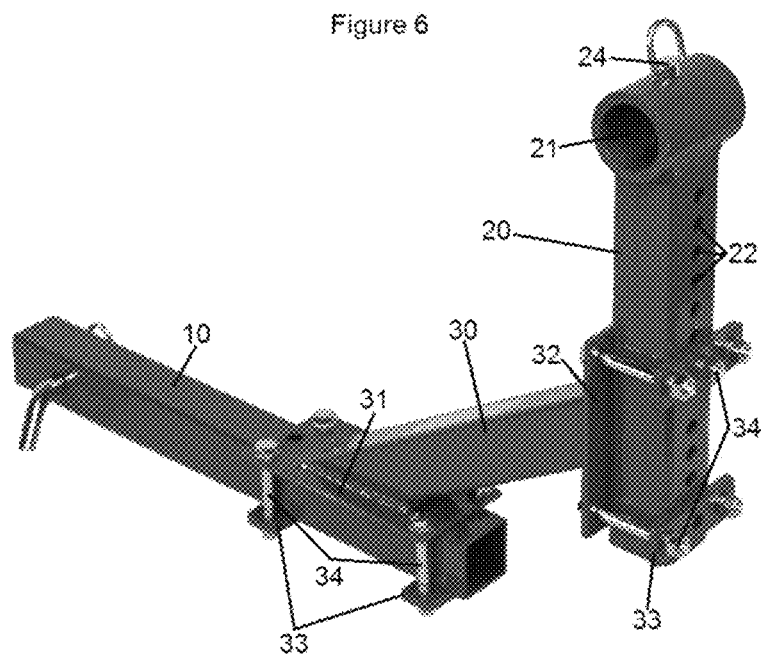
FIG. 6 is a perspective view of an embodiment of the disclosed technology.
Figure 7:
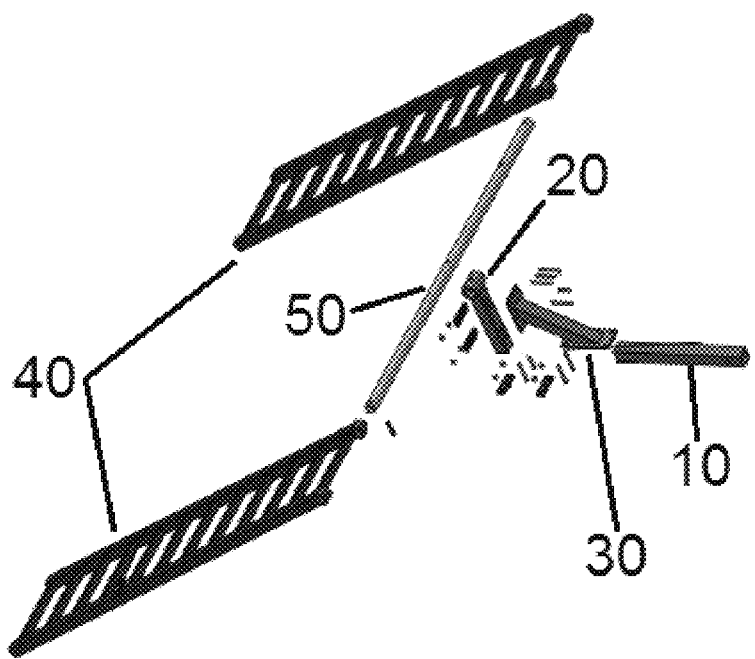
FIG. 7 is a perspective, component view of an embodiment of the disclosed technology with a ramp system.
Figure 8:
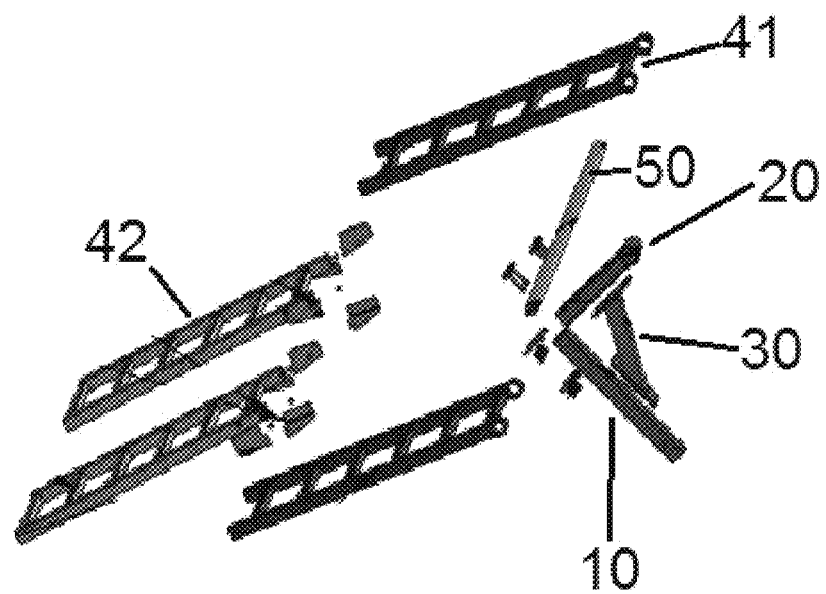
FIG. 8 is a perspective, component view of another embodiment of the disclosed technology.

As shown in FIGS. 5 and 6, the vertical support 20 comprises a hollow circular aperture 21 at the top thereof for receiving a support pipe 50 available to support loading ramps of a ramp system. A central pin aperture 23 at the top of the vertical support 20, and extending into the hollow aperture 21, may be incorporated into the design of the technology to receive a lock pin 24 to secure the support pipe to the vertical support 20, wherein the support pipe has a corresponding pin aperture to receive the locking pin 24 when the pin apertures of the vertical support and the support pipe are aligned. The vertical support 20 may be constructed from low-carbon steel 2"×2" square tubing, having a 2⅝" inside diameter circular tube affixed to the top end of the square tubing to form the circular aperture 21. Bolt securing apertures 22 centrally extend along at least a portion of the front and back of the length of the square tubing.

As shown in FIGS. 1-3 and 6, the horizontal support 10 is removably affixed to the vertical support 20 by means of the angle brace 30, the angle brace having mounting brackets 31, 32 at each end to removably secure the angle brace 30 to each of the supports 10, 20. As shown in FIG. 4, the tubular bar of the angle brace is configured as the hypotenuse of a right scalene triangle, or as a right scalene triangle or portion thereof including the hypotenuse, in each case the hypotenuse being from a 40-50-90° triangle or 20-70-90° triangle, or a triangle therebetween such as a 30-60-90° triangle, allowing the vertical support to be supported perpendicular to, and at varying heights relative to, the horizontal support. The adjustability of the height of the vertical support relative to the horizontal support allows for spatial positioning of the support pipe 50 (retained within the circular aperture 21 of the vertical support) as necessary to position and support the loading ramps at a safe angle relative to the storage structure (e.g., truck bed).

The mounting brackets 31, 32 are sized and configured to extend beyond the surface width of the horizontal and vertical supports and the ends of the tubular bar to allow bolts to be secured to the plates, about the exterior of the supports. These mounting brackets may be between 5"×3" and 7"×4" steel plates, having bolt receiving apertures 35 at each corner of the plate and a central aperture at the exterior end of each plate. The mounting bracket 31 or 32 is secured to the horizontal support 10 by a plurality of bolts 34, extending through the corner bolt receiving apertures 35 and into apertures of a plate or pair of plates 33 provided below the horizontal support 10. Nuts or similar securing structures are used to secure the bolts to the mounting bracket and the plate(s), sufficiently tightened to provide tension between the bracket, the plate(s) and the horizontal support. In this configuration, the angle brace may be positioned and removably secured anywhere along the horizontal support 10, providing additional flexibility to the spatial positioning of the vertical support 20 and corresponding spatial position of the support pipe 50, as necessary to position and support the loading ramps at a safe angle relative to the storage structure.

The opposing mounting bracket 32 or 31 of the angle brace is secured to the vertical support 20 in like manner as the design for securing the bracket to the horizontal support 10. An additional bolt 34 is provided and secured through the central aperture of the plate 32, 31, one of the apertures 22 of the vertical support, and a plate 33 on the front side of the vertical support. This additional bolt further secures the vertical support to the angle brace. As multiple apertures 22 may be provided along the front and back faces of the vertical support, the vertical support can be spatially positioned at varying heights relative to the horizontal support, as necessary to position and support the loading ramps on the support pipe 50 extending through the central aperture 21 of the vertical support 20.

Figure 1:
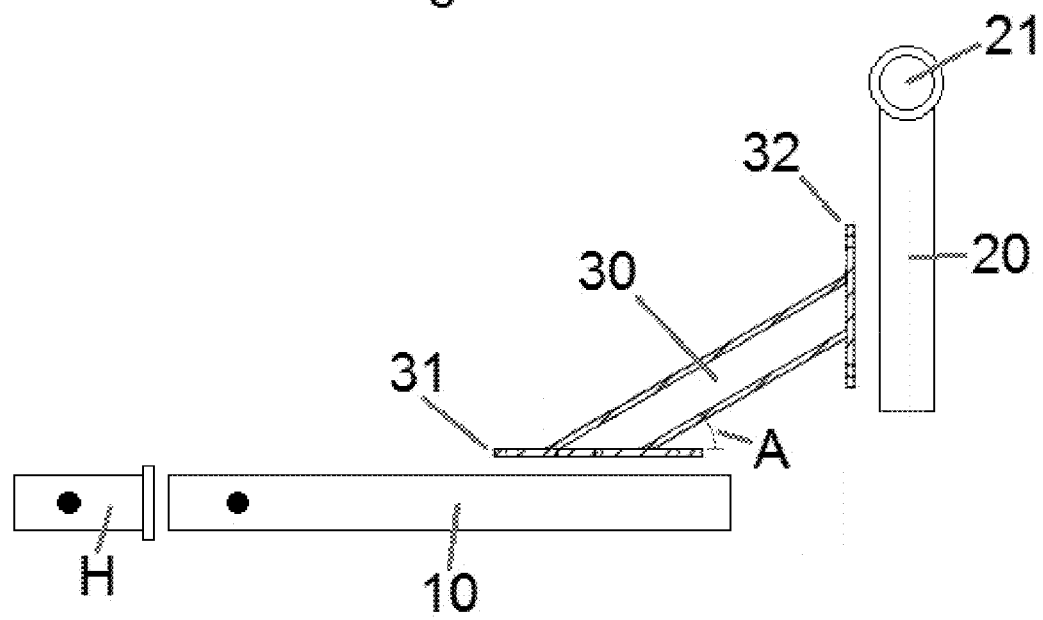
FIG. 1 is a side view of an embodiment of the disclosed technology, wherein the angle brace is provided in a first position having an incline of 30 degrees.
Figure 2:
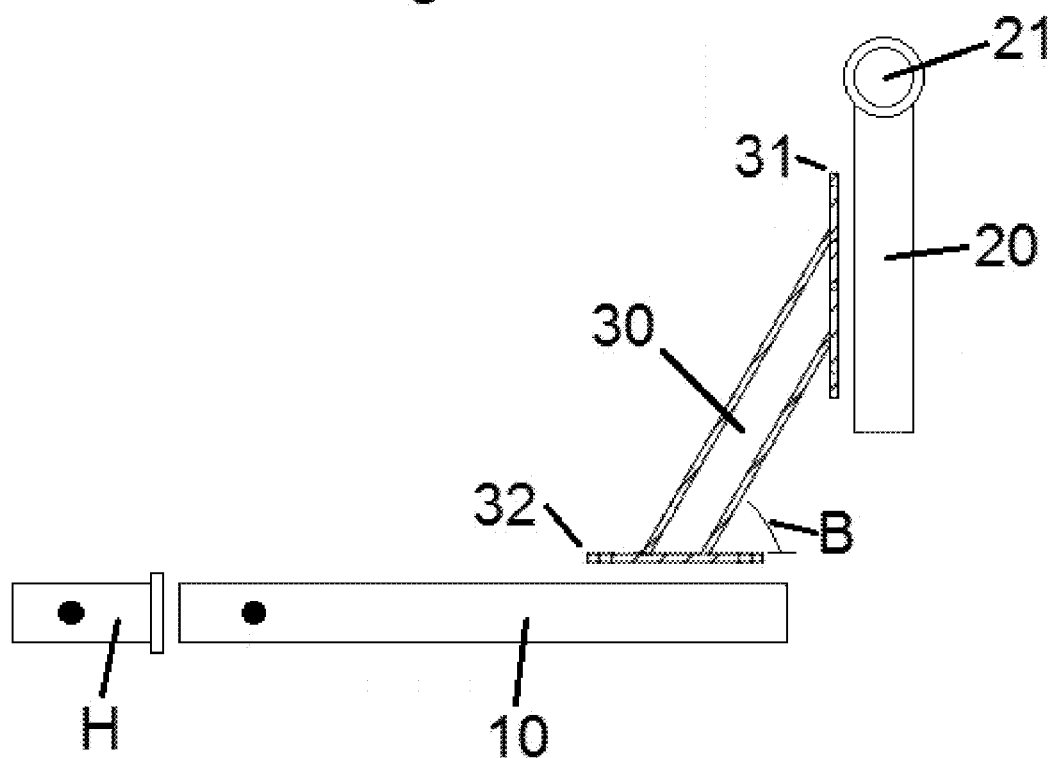
FIG. 2 is a side view of an embodiment of the disclosed technology, wherein the angle brace is provided in a second position having an incline of 60 degrees.

As shown in FIG. 1, by securing the angle brace mounting bracket 31 that corresponds to a 30° angle from horizontal to the horizontal support, the mounting bracket 32 that corresponds to a 60° angle from vertical affixes to and supports the vertical support 20 perpendicular to and extending from the horizontal support, at a lower height. By this configuration the support pipe is retained at a lower height, and the loading ramp is likewise supported at a lower height for use with small to medium sized trucks and other storage structures lower to the ground. Alternatively, as shown in FIG. 2, by affixing the angle brace mounting bracket 32 that corresponds to the 60° angle from horizontal to the horizontal support, the mounting bracket 31 that corresponds to the 30° angle from vertical affixes to and supports the vertical support at a higher height, thereby positioning the support pipe and supporting the loading ramp at a higher height for use with larger sized trucks and other storage structures higher off of the ground.

Figure 3:
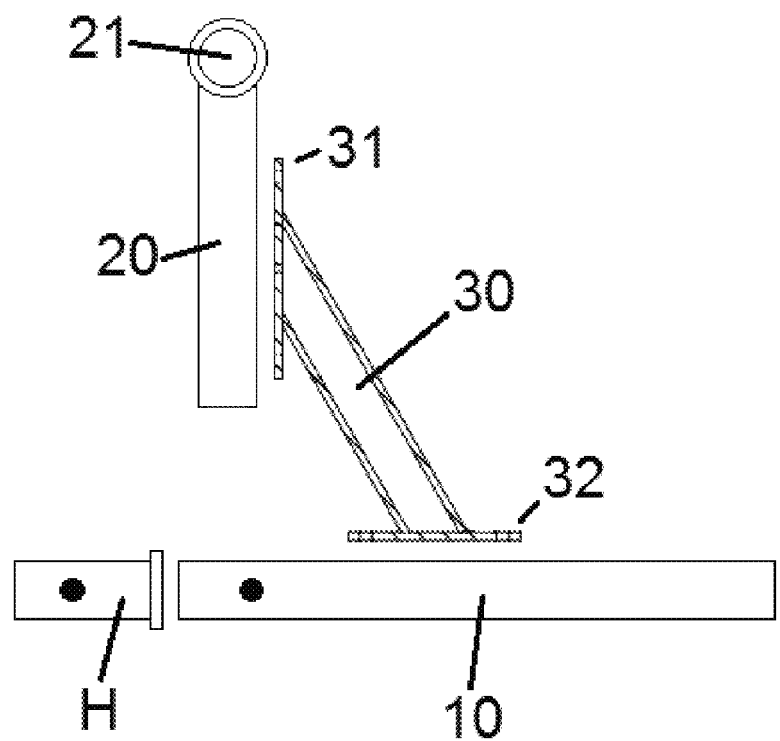
FIG. 3 is a side view of an embodiment of the disclosed technology, wherein the angle brace is provided in a third position, opposed to the first two positions.
Figure 4:
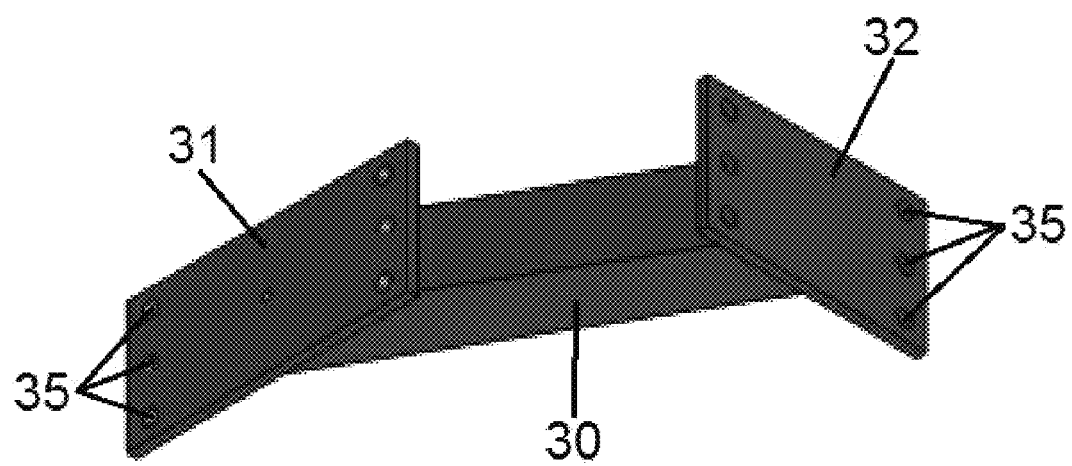
FIG. 4 is a perspective view of an angle brace useful in the disclosed technology.

In another configuration, either end 31, 32 of the angle brace mounting bracket may be affixed in a reverse position, as shown in FIG. 3, so that it supports the vertical support 20 above the horizontal support 10, allowing the structure of the disclosed technology to be used with trucks or other storage structures that do not have tailgates.

Figure 10:
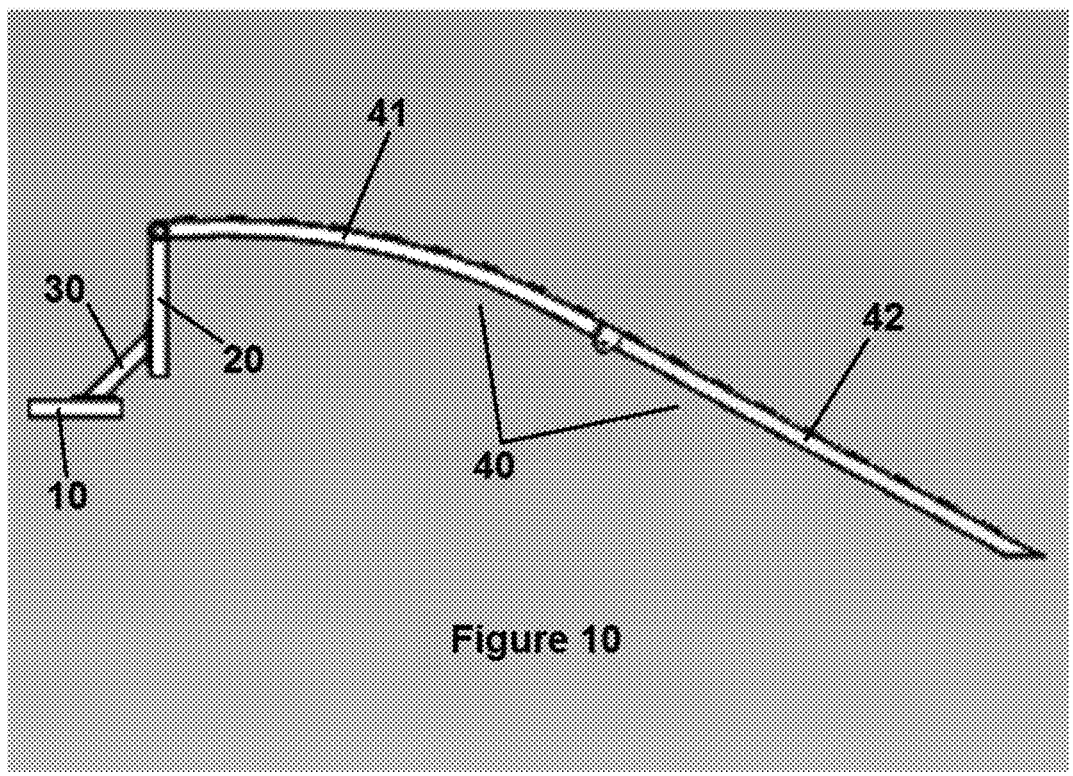
FIG. 10 is a side view of an embodiment of the disclosed technology, with an arced, hinged ladder ramp.

As shown in FIGS. 9A, 9B and 10, embodiments of the disclosed technology further include articulated, ladder-like ramps 40. In these embodiments, the ramps comprise two ladder-like ramps 41, 42, hingedly affixed by means of hinges, incorporated into the long support beams of the ramps. By this embodiment the ramps may be folded for compact storage, allowing for easier handling of the ramps.

Figure 11:
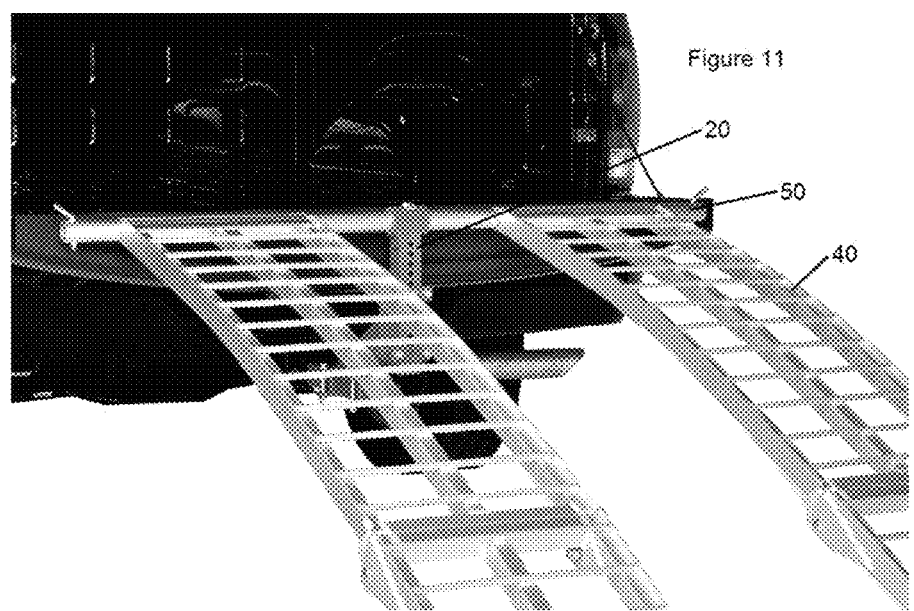
FIG. 11 is a perspective view of an embodiment of the disclosed technology, installed on a vehicle.

Embodiments of the disclosed technology further include arched top ramps, as shown in FIG. 11. By arching the top ramp of the folding ramp (e.g., by an arc of 4.5" at the center), the angle of the ramp at the transition point with the truck bed or tailgate is minimized. This smoother transition and shallower ramp angle allows vehicles with a low clearance (for example, a riding lawn mower with an underneath mowing deck) to use the ramps with the ramp support device and to be loaded or unloaded into the truck bed, without getting caught on or hung up on the underside or belly of the vehicle being loaded.

Figure 12:
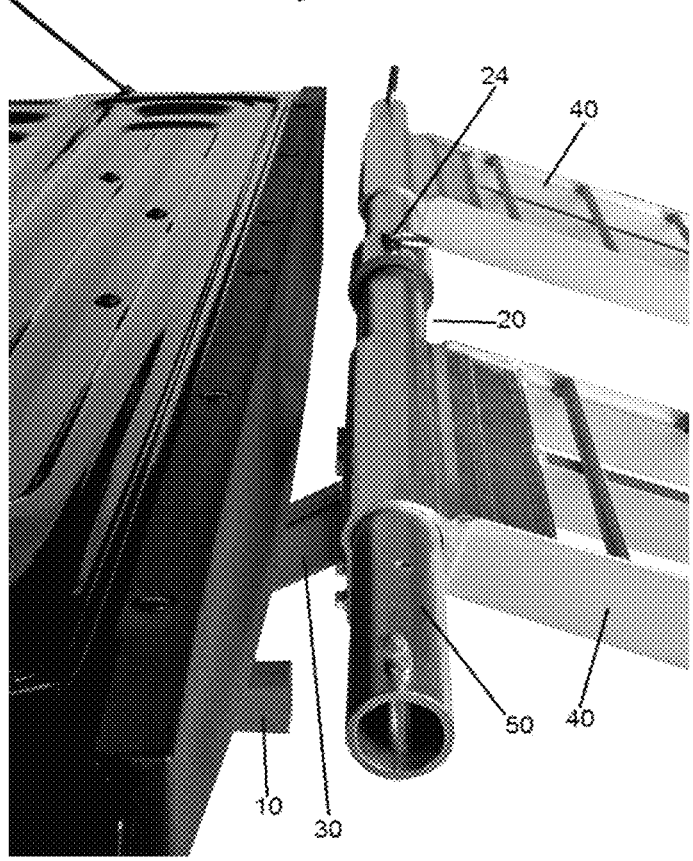
FIG. 12 is a perspective view of another embodiment of the disclosed technology, installed on a vehicle.

As shown in FIGS. 7, 8, 11 and 12, the various components of embodiments of the disclosed technology are secured by positioning the horizontal support 10 and the vertical support 20 relative to one-another, wherein the vertical support is in its desired spatial position. The positioning is held by securing the angle brace 30 to each of the horizontal and vertical supports by the mounting brackets of the angle brace and a plurality of bolts traversing the apertures in the mounting brackets and the securing plates, correspondingly positioned on opposing sides of the vertical and horizontal supports. The support bar 50 is then inserted into and secured in the central aperture 21 of the vertical bar by means of the securing pin 23. The horizontal support is received in the hitch receiver H, and the loading ramps 40 may be positioned on the support bar 50, as shown in FIGS. 11 and 12. The desired position of the vertical bar is determined by the size of the ramps 40 and the type and height of the vehicle bed, so that the ramps 40 may be positioned near or on the bed and allow safe loading of vehicles and other machinery into the storage area.

While the form of apparatus herein described constitutes a embodiments of this technology, it is to be understood that the invention is not limited to this precise form of apparatus, and that changes may be made therein without departing from the scope of the invention which is defined in the appended claims.

The invention claimed is:

1. A support system for loading ramps for vehicles or other structures comprising:
   a horizontal support designed and configured to couple with a vehicle hitch receiver;
   a vertical support having a central aperture at the top thereof to receive a support bar of a loading ramp system; and
   an angle brace designed and configured to be removably affixed to the horizontal support and the vertical support, wherein the angle brace comprises:
   a tubular bar extending at an angle of between 20 and 40 degrees or 50 and 70 degrees from horizontal,
   a first mounting bracket at one end of the tubular bar, extending in the horizontal plane, and
   a second mounting bracket at the other end of the tubular bar, extending in the vertical plane, and
   wherein each of the mounting brackets comprises apertures at each corner of the mounting bracket, and a central aperture at the center end of the mounting bracket; and
   wherein the system further comprises a plurality of plates having apertures corresponding to the apertures of the mounting brackets, and a plurality of bolts designed and configured to extend through the apertures in the mounting brackets and the plates to secure the angle brace to the horizontal and vertical supports.

2. The support system of claim 1, wherein the vertical support has a plurality of apertures extending through parallel faces thereof for receiving a bolt and securing the vertical support to one of the first and second mounting brackets of the angle brace.

3. The support system of claim 1, wherein the ramp system further comprises a pair of ladder ramps, each ladder ramp comprising two ladder ramp segments hingedly connected.

4. The support system of claim 3, wherein one of the ladder ramp segments is arched.

* * * * *